US012657727B2

(12) United States Patent
Liu et al.

(10) Patent No.: US 12,657,727 B2
(45) Date of Patent: Jun. 16, 2026

(54) METHOD AND DEVICE WITH IMAGE DATA GENERATING

(71) Applicant: SAMSUNG ELECTRONICS CO., LTD., Suwon-si (KR)

(72) Inventors: Fang Liu, Xi'an (CN); Fengtao Xie, Xi'an (CN); Fangfang Du, Xi'an (CN); Ke Lu, Xi'an (CN); Pengfei Zhao, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 18/479,441

(22) Filed: Oct. 2, 2023

(65) Prior Publication Data

US 2024/0135543 A1     Apr. 25, 2024
US 2024/0233132 A9     Jul. 11, 2024

(30) Foreign Application Priority Data

Oct. 21, 2022     (CN) .......................... 202211296580.4
Apr. 24, 2023     (KR) ........................ 10-2023-0053546

(51) Int. Cl.
*G06K 9/00*     (2022.01)
*G06T 7/11*     (2017.01)
*G06V 10/764*     (2022.01)

(52) U.S. Cl.
CPC .............. *G06T 7/11* (2017.01); *G06V 10/764* (2022.01)

(58) Field of Classification Search
CPC ........ G06T 7/11; G06V 10/26; G06V 10/454; G06V 10/764; G06V 10/82
See application file for complete search history.

(56) References Cited

U.S. PATENT DOCUMENTS

| | | | |
|---|---|---|---|
| 10,592,732 B1 | 3/2020 | Sather et al. | |
| 10,713,794 B1 * | 7/2020 | He | G06N 3/084 |
| 10,740,904 B2 | 8/2020 | Yu et al. | |
| 10,861,134 B2 | 12/2020 | Li | |
| 2018/0260957 A1 * | 9/2018 | Yang | G06T 7/143 |
| 2021/0241034 A1 * | 8/2021 | Laradji | G06N 3/08 |
| 2021/0300433 A1 * | 9/2021 | Vorobeychik | G06V 10/764 |
| 2021/0374610 A1 * | 12/2021 | Dirac | G06N 20/00 |

FOREIGN PATENT DOCUMENTS

KR     10-2020-0040240 A     4/2020

* cited by examiner

*Primary Examiner* — Hadi Akhavannik
(74) *Attorney, Agent, or Firm* — NSIP Law

(57)     ABSTRACT

A method and an electronic device with image data generating are disclosed. The electronic device includes: one or more processors; and memory storing instructions configured to cause the one or more processors to: input an input image to a target model that performs segmenting on the input image to generate a segmented image whose pixels have respective class labels predicted by the target model, calculate an optimization value for the input image based on the segmented image and based on a class label of a first grid area among a plurality of grid areas of a guide image, and optimize the input image based on the optimization value.

15 Claims, 10 Drawing Sheets

METHOD AND DEVICE WITH IMAGE DATA GENERATING

CROSS-REFERENCE TO RELATED APPLICATIONS

This application claims the benefit under 35 USC § 119(a) of Chinese Patent Application No. 202211296580.4 filed on Oct. 21, 2022, in the China National Intellectual Property Administration, and Korean Patent Application No. 10-2023-0053546, filed on Apr. 24, 2023, in the Korean Intellectual Property Office, the entire disclosures of which are incorporated herein by reference for all purposes.

BACKGROUND

1. Field

The following description relates to a method and device with image generation.

2. Description of Related Art

Techniques for compressing neural networks include quantization, pruning, knowledge distillation, and others. The effectiveness of such previous compression methods may significantly depend on availability of adequate original training datasets.

A data generation method based on a model not trained using training data has been proposed to solve the problem of the need to obtaining sufficient training data for training a model. This method data generation method may generate data based on the model's own information.

Although research on data generation methods suitable for image classification model have been active, there has been a lack of research on data generation methods suitable for an image segmentation model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: one or more processors; and memory storing instructions configured to cause the one or more processors to: input an input image to a target model that performs segmenting on the input image to generate a segmented image whose pixels have respective class labels predicted by the target model, calculate an optimization value for the input image based on the segmented image and based on a class label of a first grid area among a plurality of grid areas of a guide image, and optimize the input image based on the optimization value.

The instructions may be further configured to cause the one or more processors to repeatedly perform an operation included in a data generation method until the optimization value is less than a threshold value by using the optimized input image.

The instructions may be further configured to cause the one or more processors to calculate the optimization value by using a class label of a second grid area in the segmented image that corresponds to the first grid area.

The instructions may be further configured to cause the one or more processors to calculate a loss function value based on the class label of the first grid area and the class label of the second grid area, and calculate the optimization value based on the loss function value.

The instructions may be further configured to cause the one or more processors to calculate a regularization function value based on the class label of the first grid area and the class label of the second grid area, and calculate the optimization value based on the regularization function value.

The instructions may be further configured to cause the one or more processors to calculate a loss function value based on the class label of the first grid area and the class label of the second grid area, calculate a regularization function value based on the class label of the first grid area and the class label of the second grid area, and calculate the optimization value based on the loss function value and the regularization function value.

The first grid area may be determined based on an anchor point that is set in the plurality of grid areas, and the class label of the first grid area may be set as a class label that the target model is configured to predict.

In another general aspect, a data generation method includes: inputting an input image to a target model that performs segmenting on the input image to generate a segmented image whose pixels have respective class labels predicted by the target model; calculating an optimization value for the input image based on the segmented image and based on a class label of a first grid area among a plurality of grid areas of a guide image; and optimizing the input image based on the optimization value.

An operation included in the data generation method may be repeatedly performed until the optimization value is less than a threshold value by using the optimized input image.

The calculating the optimization value may include using a class label of a second grid area corresponding to the first grid area in the segmented image.

The calculating the optimization value may further include: calculating a loss function value based on the class label of the first grid area and the class label of the second grid area; and calculating the optimization value based on the loss function value.

The calculating the optimization value may further include: calculating a regularization function value based on the class label of the first grid area and the class label of the second grid area; and calculating the optimization value based on the regularization function value.

The calculating the optimization value may further include: calculating a loss function value based on the class label of the first grid area and the class label of the second grid area; calculating a regularization function value based on the class label of the first grid area and the class label of the second grid area; and calculating the optimization value based on the loss function value and the regularization function value.

The first grid area may be determined based on an anchor point that is set in the plurality of grid areas, and the class label of the first grid area may be set as a class label that the target model is configured to predict.

In another general aspect, a data generation method includes: refining an optimization value by repeatedly: inputting an input image to a target model that performs segmenting on the input image to generate a segmented image whose pixels have respective class labels predicted by the target model, wherein a second grid area of the segmented image corresponds to a first grid area that is selected from among a plurality of grid areas of a set guide image; calculating a loss function value and a regularization function value based on a class label of the first grid area and a class label of the second grid area; calculating an optimization value for the input image based on the loss function value and the regularization function value; and optimizing the input image based on the optimization value when the optimization value exceeds a set threshold value.

The class label of the first grid area may be set as a preset class label without being predicted.

The loss function value may be determined based on a predicted probability that the class label of the second grid area is the class label of the first grid area.

The regularization function value may be determined based on a total distribution of the input image and a distribution between the class label of the first grid area and the class label of the second grid area.

The repeated refining may be ended based on the optimization value being less than a set threshold value or the repeated refining being performed a maximum number of times.

The optimizing the input image may include backpropagating the optimization value through the target model.

Other features and aspects will be apparent from the following detailed description, the drawings, and the claims.

Figure 1:
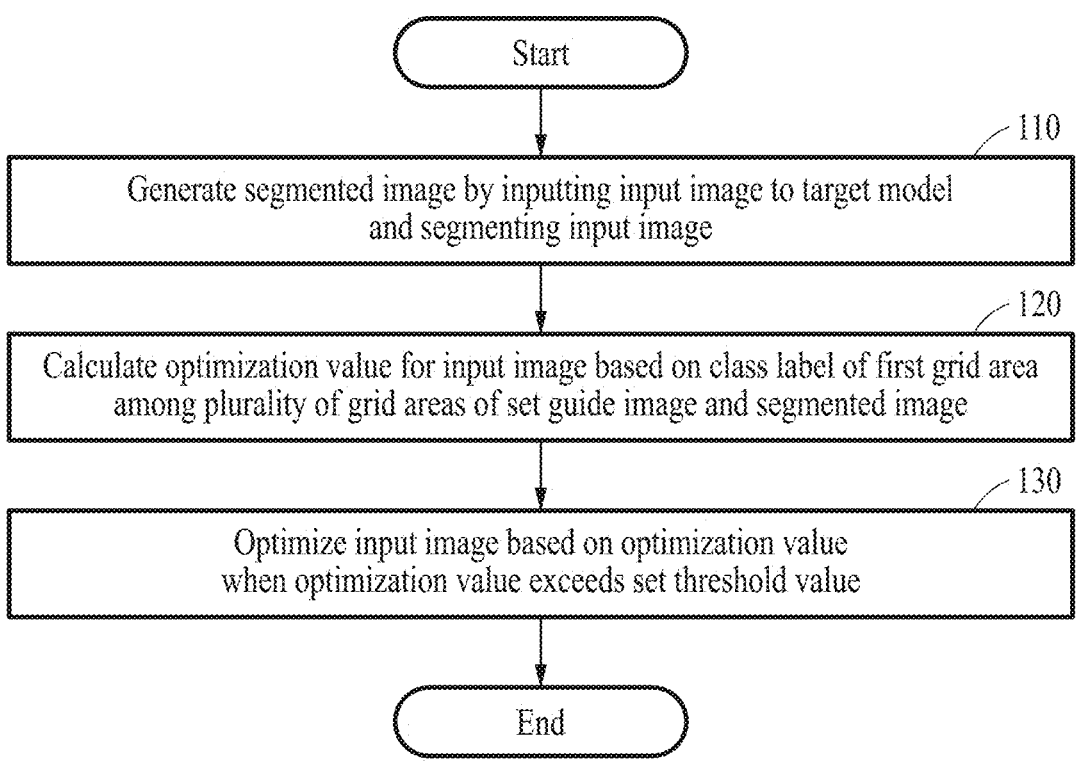
FIG. 1 illustrates an example data generation method, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

According to embodiments, data generation methods are provided. The data generation methods may be generally used for generating data based on a model configured for image segmentation and may be applied to various network models. Generated data may be relatively complete and diverse.

As noted in the Background, model compression techniques such as quantization, pruning, knowledge distillation, and others may significantly depend on original training datasets, which may be difficult and expensive to acquire.

Data generation methods based on several models that generate data based on their own information and that do not use training data are proposed. Such data generation methods may obviate the need for training data of a model.

Typical data generation methods may be divided into two main types. The first type uses statistical information as preliminary information. The statistical information may be, for example, an average and a distribution included in a batch normalization (BN) layer of a target model. The average and distribution included in the BN layer may respectively represent an offset and distribution of a data distribution of an original training dataset. Accordingly, a data input target model may be generated for the preliminary information. Then, a similarity between the statistical information (e.g., the average and distribution) of the BN layer and the target model may be improved. Therefore, a data distribution of the data generated by the target model may gradually approach the data distribution of the original training dataset.

A second type of data generation method involves using a generative adversarial network (GAN). The second type of data generation method is suitable for knowledge distillation.

The first type of method (using preliminary information) may require the existence of a BN layer in the target model. However, not all neural networks suitable to serve as a target model include a BN layer. In addition, this first type of method may only be practical for image classification for generating data for only a single target class [model?] and may not be applicable to a multi-target classification network such as a target model for image segmentation.

The second type of method—the GAN network method— may be applied for knowledge distillation and may be more focused on the accuracy of a student model rather than the completeness and diversity of generated data. The generator model of a GAN may generate data such that the student model may gradually approach a teacher model. In a repeated process, even for one iteration, a substantial amount of temporary data may be generated in order to incrementally decrease the difference between the student model and the teacher model, and such data may not have the completeness that actual training data might have.

According to embodiments, a method of generating data may be provided which may solve the technical issue of generating data to compress a model that is configured for classifying multiple targets. In addition, the data generation method may not depend on the preliminary information of the BN layer.

Generally, the data generation method may divide a guide image using grid processing, may randomly fill different class labels therein, may perform repeated grid training on an output of a target network by using a cross-entropy loss function, and may ultimately obtain data that is usable in the target model (unless the context suggests otherwise, "network" as used herein refers to a neural network).

According to embodiments, the data generation method may update an input image through repeated updates thereof, may compress the target model with the updated input image obtained after the repeated updates (which may approach a preset guide image), may obtain image data close to an original training data distribution, and may further compress the target model.

FIG. 1 illustrates an example data generation method, according to one or more embodiments.

In operation 110, an electronic device may generate a segmented image by inputting an input image to a target model which segments the input image. For example, the electronic device may divide the input image into multiple pixel sets by segmenting the input image. For example, the electronic device may predict class labels corresponding to the respective pixels of the input image by using the target model and may generate the segmented image by segmenting the input image into multiple pixel sets according to class labels. A pixel set (or segment) may be a set of mutually contiguous pixels having a same predicted class label.

For example, the segmented image may include the predicted class label of each pixel point of the input image, which may be predicted by the target model performing an inference on the input image.

The input image may be a noise image, e.g., a random noise image generated according to a Gaussian distribution, but examples are not limited thereto. For example, the noise image may be an impulse noise image or a uniform noise image. For example, the noise image may be a visible black-and-white snowflake image. The target model may be an image segmentation model (a neural network model configured for segmenting input images).

For example, the electronic device may obtain a guide image before obtaining a segmentation result of the input image from the target model. The size of the guide image may be the same as an input size (e.g., the size of the input image) of the target model, and the guide image may be a blank image. The electronic device may obtain N grid areas by performing grid processing on the guide image.

For example, the input size of the target model may be 512*512, the number of types of identifiable class labels may be 32. The electronic device may convert a designated size of whole data (e.g., whole data of guide image) into grid areas through grid processing on the guide image such that data to be noticed may be easily selected. For example, N, that is, the number of grid areas, may be set as 16*16, and the number of pixels included in each of the grid areas (i.e., the size of a grid area) may be 32*32. The dimensions described herein are examples; other dimensions and other ratios of dimensions may be used (e.g., the input image and the grid areas may not be squares).

The electronic device may set anchor points in M first grid areas of the N grid areas. In other words, the electronic device may set the anchor points in some of the grid areas. The first grid areas may be those of the grid areas in which the anchor points are set.

The number of the anchor points to be set may be determined according to the size of the input data of the target model. Here, the "size of the input data" may refer to the image size that an input layer of the target model is configured to receive. For example, the electronic device may set the number of the anchor points to 1, 2, 4, or 8. In addition, the positions of the anchor points may be evenly distributed.

The electronic device may set grid data (which is to be noticed) by setting an anchor point, and data in another position may be generated according to the contour of actual data, which may improve completeness of the data.

For example, a preset class label corresponding to a specific anchor point may be 1, the color of the preset class label may be green, and the image content corresponding to the preset class label may be a puppy. In this case, a complete contour of the puppy around a grid area including an anchor point may be generated according to data on the actual shape of the puppy, besides a partial image of the puppy being displayed in the grid area including the anchor point, in finally generated image data (e.g., an updated input image). For example, contour of the puppy around a grid area created around the grid area may correspond to the generated data.

In operation 120, the electronic device may calculate an optimization value for the input image based on a class label of a first grid area (one of a plurality of grid areas of a guide image) and based on the segmented image. The class label may be randomly pre-assigned to the first grid area of the guide image.

The electronic device may obtain the optimization value by using a backward propagation algorithm to which a gradient descent technique is applied. The backward propagation algorithm may include a stochastic gradient descent (SGD) technique, but examples are not limited thereto.

The segmented image may be divided into N grid areas using, for example, the same method used for dividing the preset guide image. The N grid areas of the segmented image may respectively correspond to the N grid areas of the preset guide image obtained by dividing the preset guide image.

The electronic device may obtain the optimization value for the input image based on a preset class label of each pixel point of M first grid areas and a predicted class label of each pixel point of M second grid areas among the N grid areas of the segmented image.

In this case, the M first grid areas and the M second grid areas may each be positioned corresponding to the preset guide image and the segmented image. In other words, the M first grid areas may have a one-to-one correspondence with the M second grid areas. The electronic device may determine the M second grid areas among the plurality of grid areas of the segmented image based on the respective positions of the M first grid areas.

For M grid area pairs of the M first grid areas and the M second grid areas (a grid area pair being a first grid area paired with its corresponding second grid area), the electronic device may calculate loss function values respectively corresponding to the grid area pairs. The loss function value of a given grid area pair may be calculated based on a preset class label of a pixel point of the first grid area in the given grid area pair and a predicted class label of a pixel point of the second grid area in the given grid area pair. The electronic device may obtain M loss function values by calculating loss function values respectively corresponding to the M grid area pairs.

A grid area pair may include one first grid area paired with one second grid area that corresponds to the first grid area. For example, when the first grid area is positioned at (a, b) (a positional index among the plurality of grid areas of the guide image), the second grid area may correspond to the first grid area in that the second grid area is also positioned at (a, b) (a positional index among the plurality of grid areas of the segmented image).

The electronic device may determine the optimization value for the input image based on the M loss function values.

For example, under the assumption that the preset guide image includes 8 anchor points, the electronic device may calculate a loss function value based on a preset class label corresponding to each pixel point of each of the first grid areas respectively including the 8 anchor points and a predicted class label corresponding to each pixel point of each of second grid areas respectively corresponding to the first grid areas. In this case, the electronic device may obtain 8 loss function values corresponding to a total of 8 grid area pairs. The electronic device may calculate a loss function value corresponding to a grid area pair including a first grid area and a second grid area.

The electronic device may calculate a regularization function value based on a predicted class label of each pixel point of the plurality of grid areas included in the segmented image and a preset class label corresponding to each pixel point of the M first grid areas.

For example, the electronic device may calculate a regularization function value based on the predicted class label of each pixel point of the plurality of grid areas included in the segmented image and a preset class label value corresponding to each pixel point of each of the 8 first grid areas under the assumption of the foregoing example. The electronic device may regularize generated image data by using a regularization function and increase the stability and speed of the generated image data through such regularization.

The electronic device may determine the optimization value for the input image based on the regularization function value and the M loss function values. Under the assumption of the foregoing example, the electronic device may determine the optimization value according to the regularization function value and 8 loss function values corresponding to 8 grid area pairs including 8 first grid areas and 8 second grid areas corresponding to the 8 first grid areas.

The electronic device may calculate a loss function value by using a cross-entropy loss function. The electronic device may calculate the cross-entropy loss function according to Equation 1.

$$L = -\frac{1}{Q}\sum_{i}\sum_{c=1}^{T}y_{ic}\log(p_{ic})$$

<div align="right">Equation 1</div>

In Equation 1, L denotes the cross-entropy loss function, Q denotes the number of pixel points included in each first grid area, and T denotes the number of identifiable class labels in the target model. For example, as described above, T may be 10, and a class label c may be an integer of 0 to $T-1$. When a preset class label value of an ith pixel point of a first grid area is c, $y_{ic}=1$, or otherwise, $y_{ic}=0$. $p_{ic}$ is a probability, predicted by the target model, that a class label of an ith pixel point of a second grid area is c.

The electronic device may calculate the sum of loss function values respectively corresponding to the M first grid areas. For example, under the assumption that the preset guide image includes 8 anchor points, the electronic device may calculate the sum of 8 loss function values corresponding to the 8 first grid areas that include the 8 anchor points. The electronic device may calculate the sum of the loss function values corresponding to the M first grid areas according to Equation 2.

$$\sum_M L(\hat{x}_M, y_M) \qquad \text{Equation 2}$$

In Equation 2, $\hat{x}$ denotes random noise (e.g., the input image) according to a Gaussian distribution of an input target model, M denotes the number of anchor points of a preset guide image, $y_M$ denotes a first grid area including an Mth anchor point of the preset guide image, $\hat{x}_M$ denotes a second grid area corresponding to $y_M$ of the random noise, and $L(\hat{x}_M, y_M)$ denotes a cross-entropy loss function between the first grid area including the Mth anchor point and the second grid area corresponding to the first grid area in the random noise.

The electronic device may calculate a total distribution value corresponding to the noise image (or the input image) based on a predicted class label of each pixel point thereof. The electronic device may calculate an L2-norm value corresponding to the first grid area based on a preset class label corresponding to each pixel point of each of the M first grid areas and based on the predicted class label.

Under the assumption that the preset guide image includes 8 anchor points, the electronic device may calculate an L2-norm value corresponding to the preset class label corresponding to each pixel point of each of the first grid areas and the predicted class label for the first grid areas respectively including 8 anchor points. The electronic device may obtain 8 L2-norm values respectively corresponding to the 8 first grid areas.

The electronic device may determine a regularization function value according to the 8 L2-norm values and according to the total distribution corresponding to the noise image (or the input image). For example, the electronic device may determine the regularization function value according to the 8 L2-norm values (respectively corresponding to the 8 first grid areas) and according to the total distribution corresponding to the noise image.

The electronic device may calculate the L2-norm values and the total distribution corresponding to the noise image according to Equation 3.

$$R_{l2} = \frac{1}{Q}\sum_{i=1}^{Q}[y_i - F_i]^2 \qquad \text{Equation 3}$$

$$R_{tv} = E\left\{\sum_{i=1}^{S}[X_i - E(x)]^2\right\}$$

In Equation 3, $R_{l2}$ denotes an L2-norm value of a first grid area, Q denotes the number of pixel points included in each of the M first grid areas, $y_i$ denotes a preset class label value corresponding to an ith pixel point in the first grid area, and $F_i$ denotes a predicted class label corresponding to the ith pixel point of the first grid area.

In Equation 3, $R_{tv}$ denotes the total distribution corresponding to the noise image, S denotes the number of pixel points included in the noise image, $X_i$ denotes a predicted class label corresponding to each of the pixel points included in the noise image, and E(x) denotes an average value of predicted class labels corresponding to the S pixel points.

The electronic device may calculate the sum of the L2-norm values corresponding to the M first grid areas. For example, under the assumption that the preset guide image includes 8 anchor points, the electronic device may calculate the sum of 8 L2-norm values corresponding to 8 first grid areas including the 8 anchor points.

The electronic device may calculate the sum of the L2-norm values corresponding to the M first grid areas according to Equation 4.

$$\sum_M R_{l2}(\hat{x}_M, y_M) \qquad \text{Equation 4}$$

In Equation 4, $\hat{x}$ denotes random noise (e.g., the input image) according to the Gaussian distribution that is input to the target model, M denotes the number of anchor points of the preset guide image, $y_M$ denotes the first grid area including the Mth anchor point of the preset guide image, $\hat{x}_M$ denotes the second grid area (in the random noise) corresponding to $y_M$, and $R_{l2}(\hat{x}_M, y_M)$ denotes an L2-norm value between the first grid area including the Mth anchor point and the second grid area corresponding to the first grid area.

The electronic device may calculate a regularization function according to Equation 5.

$$R(\hat{x}) = \alpha_{tv}R_{tv}(\hat{x}) + \alpha_{l2}R_{l2}(\hat{x}) = \alpha_{tv}R_{tv}(\hat{x}) + \alpha_{l2}\sum_M R_{l2}(\hat{x}_M, y_M) \qquad \text{Equation 5}$$

In Equation 5, $R(\hat{x})$ denotes the regularization function, $\hat{x}$ denotes the random noise according to the Gaussian distribution of the input target model, $R_{tv}(\hat{x})$ denotes the total distribution corresponding to the noise image described above, and $R_{l2}(\hat{x})$ denotes the sum of the L2-norm values corresponding to the M first grid areas described above. $\alpha_{tv}$ and $\alpha_{tv}$ both are proportional coefficients and unchanging constants that may be set depending on actual demands.

In operation 130, the electronic device may optimize the input image based on the optimization value when the optimization value exceeds a set threshold value. The electronic device may obtain the optimized input image based on the optimization value. The threshold value may be set depending on actual demands and may be 0.001, for example.

The electronic device may calculate the optimization value according to Equation 6.

$$\sum_M L(\hat{x}_M, y_M) + R(\hat{x}) = \qquad \text{Equation 6}$$

$$\sum_M L(\hat{x}_M, y_M) + \alpha_{tv}R_{tv}(\hat{x}) + \alpha_{l2}\sum_M L(\hat{x}_M, y_M)$$

The electronic device may repeatedly perform operations 110, 120, and 130 included in the data generation method of FIG. 1 until the optimization value is less than or equal to the threshold value by using the optimized input image.

Figure 2:
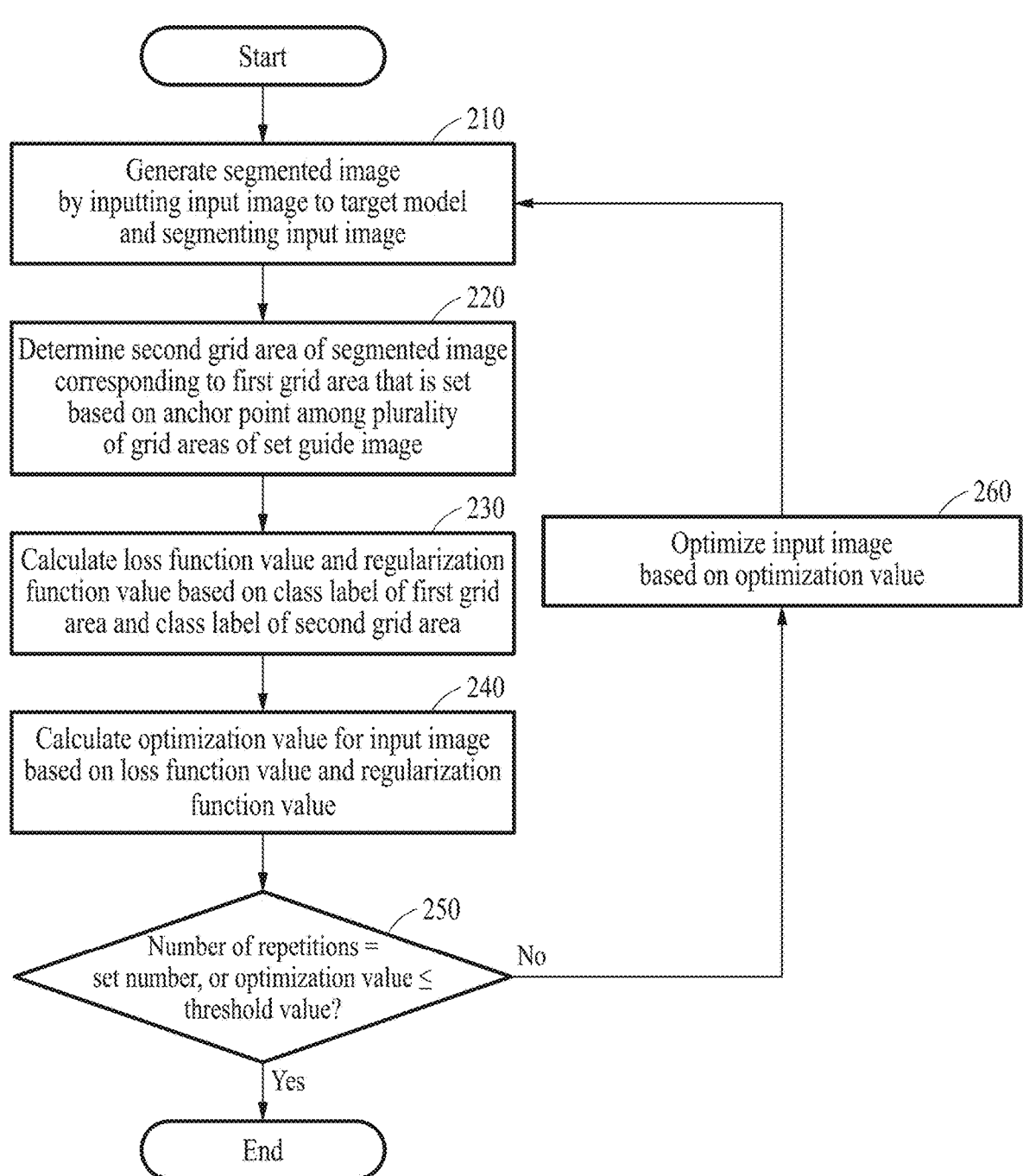
FIG. 2 illustrates an example of repeatedly performing a data generation method, according to one or more embodiments.

FIG. 2 illustrates an example of repeatedly performing a data generation method, according to one or more embodiments.

In operation 210, an electronic device may generate a segmented image including class labels respectively predicted for the pixels of an input image. Specifically, the input image may be inputted to a target model which segments the input image (predicts the labels of the respective pixels).

For example, an input size of the target model may be 512*512, the number of identifiable class labels may be 32. The target model may be configured to receive square input data or non-square input data. For example, the target model may be a multi-target segmentation model (i.e., may predict multiple classes). The input image may be a random noise image according to a Gaussian distribution.

In operation 220, the electronic device may determine a second grid area of the segmented image corresponding to a first grid area. The first grid area may be set (selected), from among grid areas of a set guide image, based on having an anchor point.

The segmented image may include class labels predicted for all respective pixel points in the noise image (e.g., the input image). The segmented image may be divided into a plurality of grid areas, e.g., using the same method used to divide the guide image. The electronic device may determine a second grid area of the input image corresponding to the first grid area of the guide image. The first grid area of the guide image may correspond one-to-one to the second grid area of the input image.

In operation 230, the electronic device may calculate a loss function value and a regularization function value based on a class label of the first grid area and a class label of the second grid area.

For example, the electronic device may calculate the loss function value by using a cross-entropy loss function. The electronic device may determine the regularization function value according to an L2-norm value of the second grid area (corresponding to the first grid area) and according to a total distribution corresponding to the input image.

In operation 240, the electronic device may calculate an optimization value for the input image based on the loss function value and the regularization function value, for example, according to Equation 6 above.

In operation 250, the electronic device may determine whether a number of performed repetitions (iterations) of operations 210, 220, 230, 240, and 260 has reached a set number or whether the optimization value is less than or equal to a threshold value. For example, the set number of iterations may be 100.

When determined in operation 250 that the number of repetitions has not reached the set number and that the optimization value exceeds the threshold value, the electronic device may perform operation 260 and optimize the input image based on the optimization value. An example of optimizing an input image based on an optimization value is described with reference to FIG. 10.

When operation 210 is performed after operation 260, the electronic device may use the optimized input image (as per the previous iteration/repetition) as an input image for the new/current iteration/repetition. For example, after operation 260, the electronic device may input the optimized input image to the target model and may perform operation 210.

The electronic device may update the noise image (e.g., the input image) through repeated updates. The noise image after the updates may be used as a noise image of an input target model for the next repetitive update.

For example, the electronic device may perform an operation of setting a guide image. The electronic device may set the guide image by setting a preset class label to each pixel point of the first grid area that includes an anchor point.

When the number of repetitions reached the set number, or when the optimization value is less than or equal to the threshold value in operation 250, the electronic device may output the updated input image as an optimized input image. When these repeated updates are completed, the electronic device may use the final thus-obtained optimized image (the image after the repeated updates) as an image for compressing the target model.

The electronic device may repeatedly perform the method of FIG. 2 to output the set number of optimized input images. For example, the electronic device may set/generate a new guide image (e.g., a random noise image) whenever outputting an optimized input image (e.g., with each iteration/repetition of the loop of FIG. 2). The electronic device may perform the method of FIG. 2 by using a set guide image and an input image and may output/generate the set number of optimized input images.

The electronic device may repeatedly perform the method of FIG. 2 until obtaining the pieces of quantized data to be used for the static quantization of an image segmentation model (e.g., the target model). For example, (dynamic or static) quantization of an image segmentation model and quantized data, a description of (dynamic or static) quantization of an image segmentation model of a known image segmentation model and known quantized data can be applied.

With respect to the image segmentation model, the position of an anchor point and the size of a grid area may be fixed (or determined in any way that is independent of the content of the input image), but a class label of the grid area including the anchor point may be configured depending on actual needs. For example, under the assumption that the number of identifiable class labels is 10 in the image segmentation model, when resetting the preset guide image, the electronic device may randomly select one class label from among ten class labels, that is, class labels 0 to 9, for grid areas respectively including anchor points, and may set the selected class label as the class label of the grid area including the anchor point.

Figure 3:
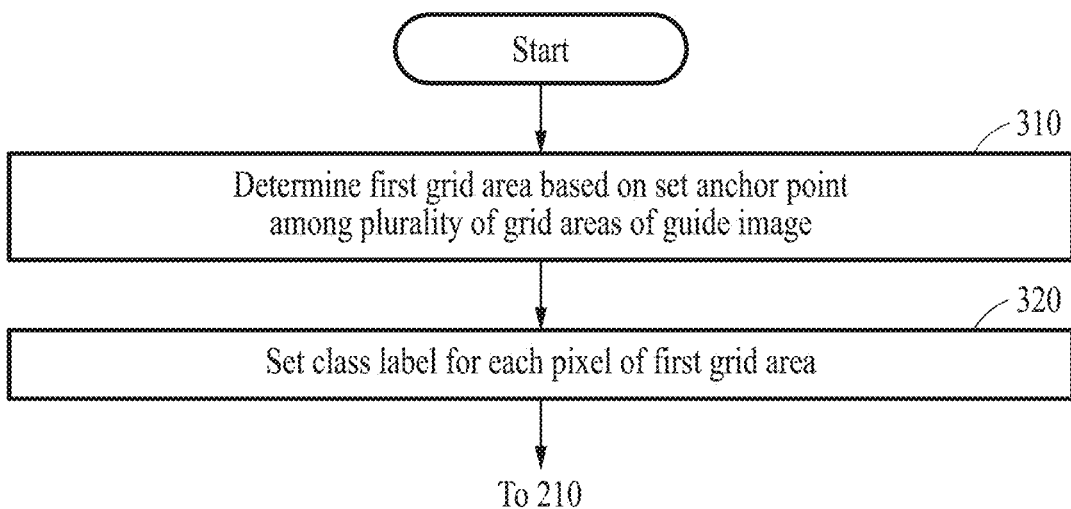
FIG. 3 illustrates an example of setting a guide image, according to one or more embodiments.

FIG. 3 illustrates an example of setting a guide image, according to one or more embodiments.

Referring to FIG. 3, the electronic device may determine a first grid area based on a set anchor point among a plurality of grid areas of (divisions of) the guide image in operation 310. The number of anchor points may be determined based on the size of input data that an image segmentation model is configured to receive (e.g., at an input layer). For example, the electronic device may set candidate items of the number of the anchor points to 1, 2, 4, or 8. The positions of the anchor points may be evenly distributed (e.g., generally of a uniform distance from each other).

In operation 320, the electronic device may set a class label for each pixel of the first grid area. That is, each pixel of the first grid area may be assigned the same class label.

More specifically, the electronic device may add a preset class label to each pixel point of the first grid area that includes an anchor point. For example, the electronic device may randomly select class labels for respective first grid areas that include respective anchor points and may set the pixels of the first grid areas to be the corresponding random class labels. Put another way, each first grid area having an anchor point may have its own random class label which its pixel points are set to. Thus, filling first grid areas that include an anchor point may maximally diversify a target of each anchor point and may provide diversity of the data generated by differentiating the first grid area including each anchor point.

In addition, when the electronic device adds a class label to each pixel point of a first grid area that includes an anchor point, the added class label may be a class label that is also a label that the image segmentation model (e.g., a target model) is configured to identify. Moreover, each class label may correspond to a class label color and image content.

For example, a specific class label may be 1, the class label color corresponding to the class label 1 may be green, and the image content corresponding to the class label 1 may be a puppy. As another example, a specific class label may be 3, the class label color corresponding to the class label 3 may be red, and the image content corresponding to the class label 3 may be a painting.

FIGS. 4, 5, 6, and 7 illustrate examples of an anchor point, according to one or more embodiments.

Figure 4:
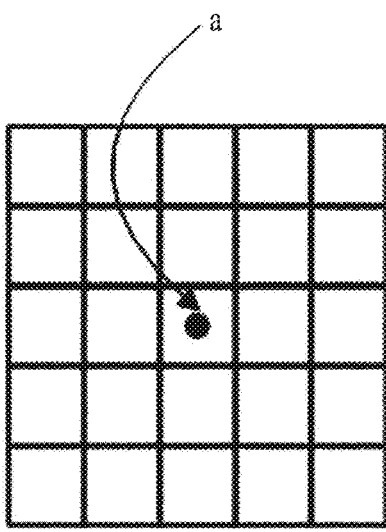
FIGS. 4, 5, 6, and 7 illustrate examples of anchor points, according to one or more embodiments.
Figure 5:
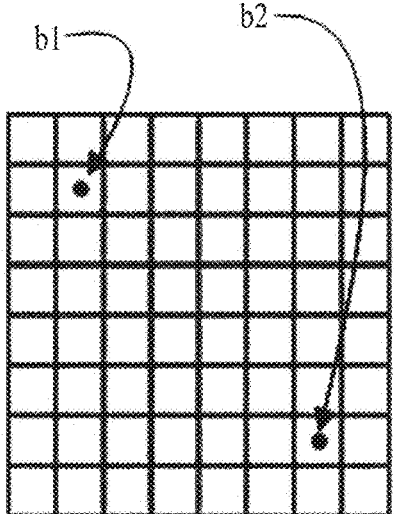
Figure 6:
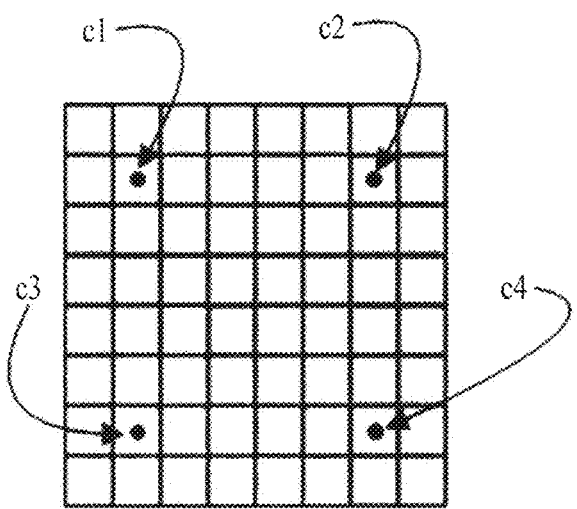
Figure 7:
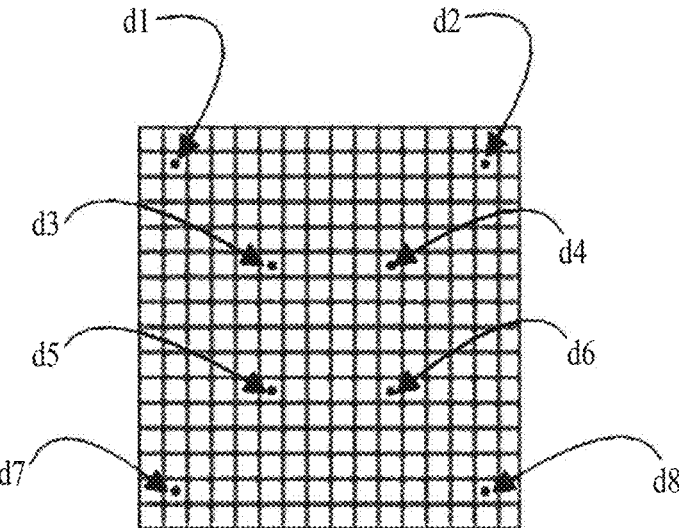

FIGS. 4, 5, 6, and 7 illustrate four examples of types of anchor point settings. FIG. 4 shows an example of setting only one anchor point a, FIG. 5 shows an example of setting two anchor points b1 and b2, FIG. 6 shows an example of setting four anchor points c1, c2, c3, and c4, and FIG. 7 shows an example of setting eight anchor points d1, d2, d3, d4, d5, d6, d7, and d8.

To increase the pieces of information for generating data and to increase a difference between anchor points, an electronic device may obtain a guide image by randomly assigning a preset class label to each of the M first grid areas that includes an anchor point. The electronic device may set the same class label to all pixel points of one first grid area.

For example, the electronic device may fill each pixel point of each first grid area including an anchor point with a respective randomly selected class label. The electronic device may maximally diversify a target of each anchor point and may ensure the diversity of data generated by differentiating a grid area including each anchor point.

A target model may be trained with a dataset for image segmentation. Different datasets may respectively correspond to the different numbers and types of class labels. For example, the number of class labels corresponding to a specific dataset may be 10, and the class label values thereof may be 0 to 9. In another example, the number of class label values corresponding to another dataset may be 100, and the class labels thereof may be 0 to 99.

When the electronic device adds a preset class label to each pixel point of a first grid area that includes an anchor point, the added preset class label may be a class label that the target model is configured to be capable of identifying. For example, under the assumption that the target model is trained with a dataset in which the number of class labels is 10, the electronic device may set one of 0 to 9 (any of the ten class label values corresponding to the dataset) as the preset class label added to the first grid area including the anchor point.

Each class label may correspond to a class label color and image content. For example, a class label may be 1, the class label color corresponding to the class label 1 may be green, and the image content corresponding to the class label 1 may be a puppy. As another example, the class label may be 3, the class label color corresponding to the class label 3 may be red, and the image content corresponding to the class label 3 may be a piece of a painting.

Figure 8:
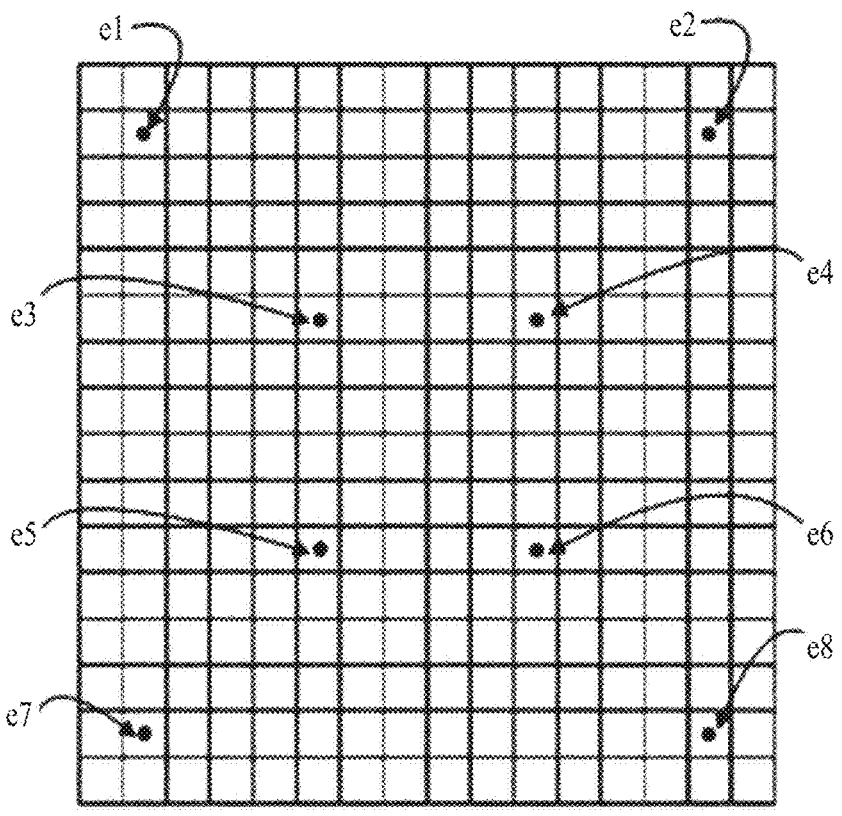
FIGS. 8 and 9 illustrate examples of adding a class label to a first grid area that includes an anchor point, according to one or more embodiments.
Figure 9:
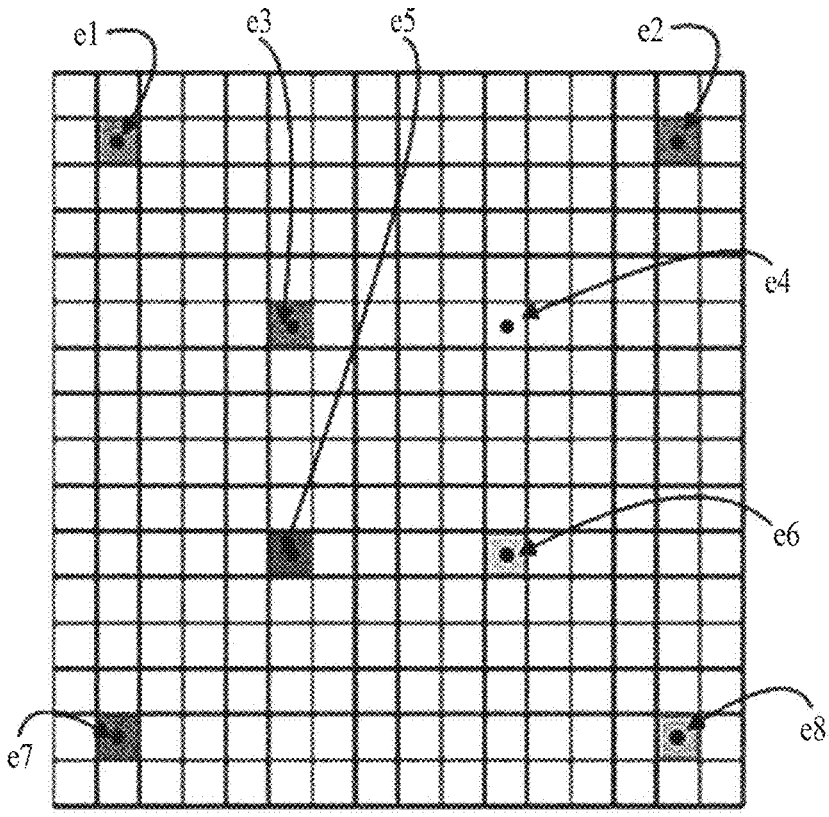

FIGS. 8 and 9 illustrate examples adding a class label to a first grid area that includes an anchor point, according to one or more embodiments.

Referring to FIG. 8, a guide image may include 16*16 first grid areas, eight of which include eight anchor points e1, e2, e3, e4, e5, e6, e7, and e8.

FIG. 9 illustrates an example of adding different class labels respectively to the eight first grid areas that included the eight anchor points of FIG. 8. Specifically, different class label colors filling the eight first grid areas respectively including the eight anchor points indicates that different class labels are added to the eight first grid areas respectively including the eight anchor points. For example, the first grid areas that include the anchor points are modified so that the pixel points have the class label colors.

Figure 10:
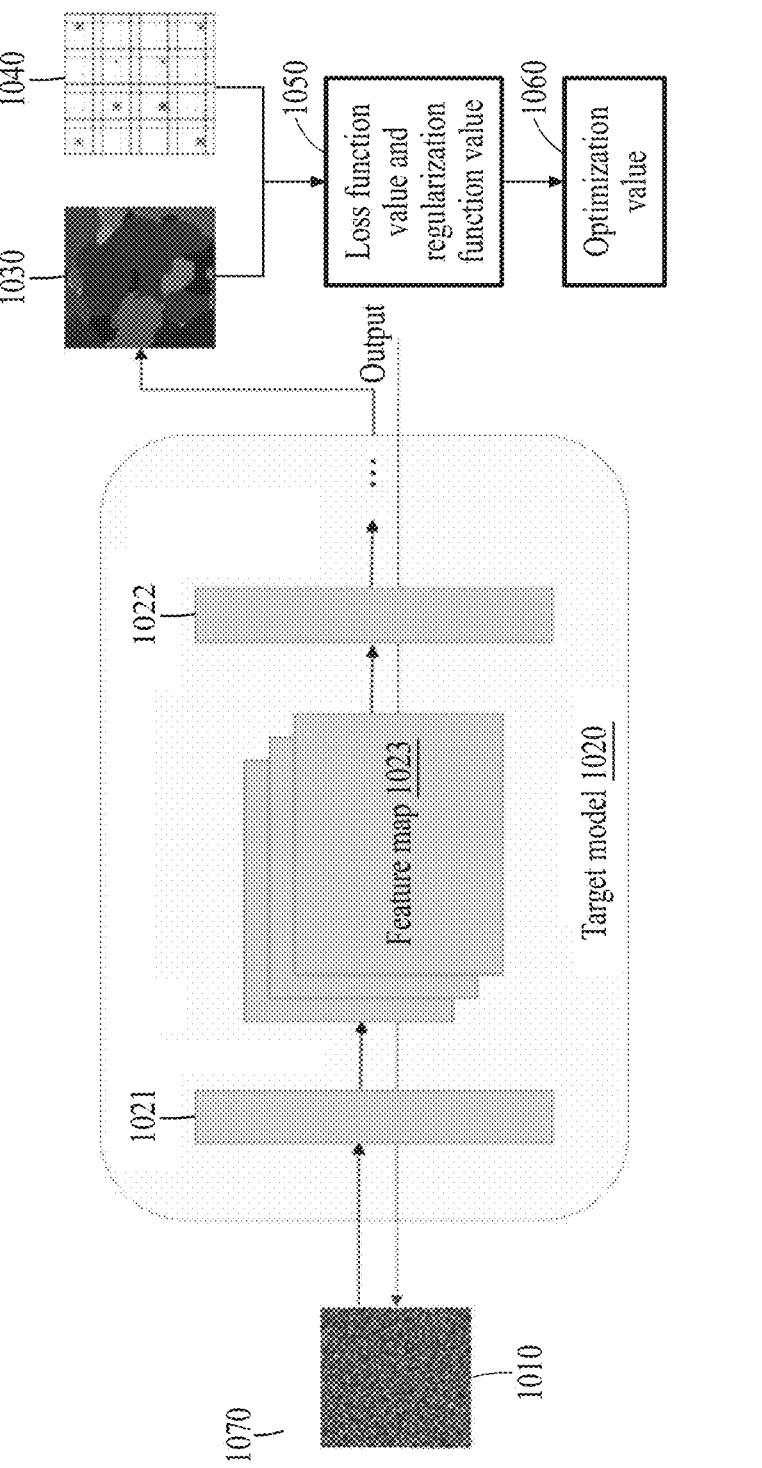
FIG. 10 illustrates an example of updating an input image, according to one or more embodiments.

FIG. 10 illustrates an example of updating an input image, according to one or more embodiments.

FIG. 10 illustrates the updating (e.g., optimizing) of a noise image 1010 (e.g., the input image) in a repetitive update method. Referring to FIG. 10, an electronic device may calculate (e.g., iteratively refine) an optimization value in a repetitive update process in operation 1070 (e.g., as described with reference to FIG. 2), and then may propagate the calculated optimization value backward to a noise image. The electronic device may propagate the optimization value backward to the noise image through each layer of a target model 1020, starting from an output layer of the target model 1020, and may thus update the noise image by using the calculated optimization value. Details of this optimization process are described next.

The electronic device may output a segmented image 1030 by inputting an input image 1010 to the target model 1020. The target model 1020 may generate a feature map 1023 by using a convolutional layer 1021. The target model 1020 may output the segmented image 1030 by using a convolutional layer 1022. In other words, the target model 1020 may be, or may include, a convolutional neural network (CNN), which may include a fully connected layer that maps feature map(s) to predicted classes of pixels.

The electronic device may calculate a loss function value and regularization function value 1050 by using the segmented image 1030 and a guide image 1040. The electronic device may calculate an optimization value 1060 by using the loss function value and regularization function value 1050.

According to embodiments, the electronic device may update a color value, e.g., a red, green, and blue (RGB) value of each of a plurality of pixel points included in the input image 1010 based on the optimization value 1060. The electronic device may set an optimizer for the target model 1020 and may stack a specific layer (e.g., a weight of the convolutional layers 1021 and 1022 or random noise) to be updated based on the optimizer.

When propagating the optimization value backward in each layer starting from the output layer of the target model 1020, the electronic device may search for a layer of the target model 1020 that is to be updated by the optimizer. In some embodiments, layer optimization is not performed, that is to say, there is no search for a layer to be updated, rather, the electronic device only propagates the optimization value backward until the optimization value is propagated to the noise image. For example, in a process of each repetitive update, the target model 1020 may remain fixed, that is, weights of each of the layers of the target model 1020 may be fixed. The electronic device may adjust and update the noise image only without adjusting each layer of the target model 1020.

According to embodiments, a condition for ending repeated updates may be a current repetition number reaching a preset maximum number of repetitions. The preset maximum number of repetitions may be set depending on actual needs. For example, the preset maximum number of repetitions may be set to 100 repetitions. When the number of repetitions reaches 100, the electronic device may determine that the repeated updates end, and an updated noise image obtained after the repeated updates may be used as an image for compressing the target model 1020.

According to embodiments, the condition for ending the repeated updates may be an optimization value being less than or equal to a preset threshold value, which may be tested each time a repetition/iteration ends. The preset threshold value may be set depending on actual needs. For example, the threshold value may be 0.001. When the optimization value when a repeated update completes is determined to be less than or equal to 0.001, the electronic device may end the repeated updating, and the updated (e.g., optimized) noise image obtained after the repeated updating ends may be used as an image for compressing the target model 1020.

The compression of an image segmentation model (e.g., the target model 1020) may include quantization of the image segmentation model. Model quantization is a model compression technique of, for example, converting a floating-point value into an integer value. For example, when an original image segmentation model is a float32 model, one weight may be expressed as float32. An int8 model may be obtained from the float32 model by quantizing the float32 image segmentation model, in which one quantized weight may be expressed as int8. In this method, the size (amount of data) of the image segmentation model may decrease, and storage overhead may also decrease. As another example, a float64 weight may be converted to a float32 weight.

Figure 11:
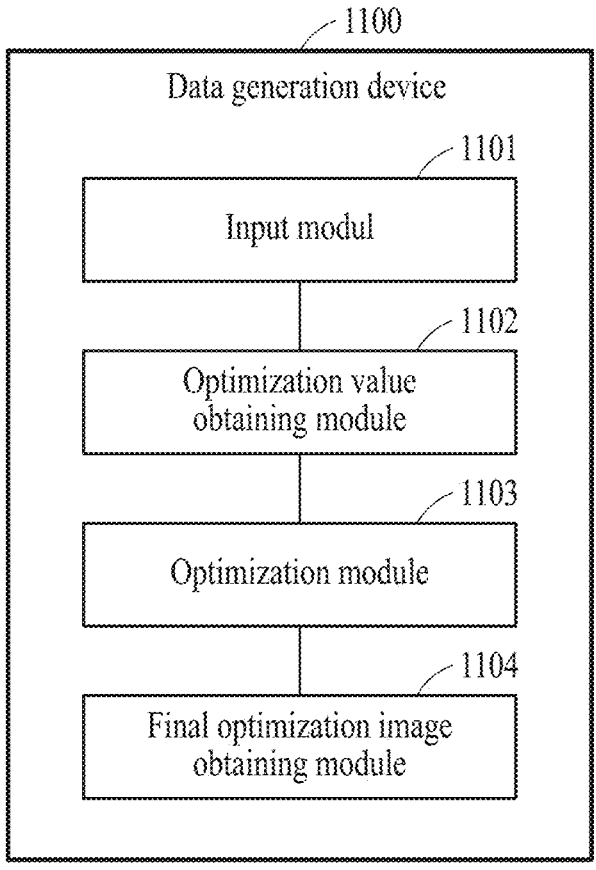
FIG. 11 illustrates an example data generation device, according to one or more embodiments.

FIG. 11 illustrates an example data generation device 1100, according to one or more embodiments.

Referring to FIG. 11, the data generating device 1100 may include an input module 1101, an optimization value obtaining module 1102, an optimization module 1103, and a final optimization image obtaining module 1104.

The input module 1101 may obtain a segmented image by inputting an input image to a target model. The segmented image may include class label values of the respective pixel points of the input image, as predicted by the target model.

The input image may be a noise image. The noise image may be a random noise image according to a Gaussian distribution, but examples are not limited thereto. For example, the noise image may be an impulse noise image or a uniform noise image. For example, the noise image may be a visible black-and-white snowflake image. The target model may be an image segmentation model.

According to embodiments, the data generation device 1100 may further include a guide image obtaining module, a grid processing module, an anchor point setting module, and a label value assigning module.

Before obtaining the segmented image by inputting the input image to the target model, the data generation device 1100 may obtain a guide image by using the guide image obtaining module. The size of the guide image may be the same as an input size of the target model, and the guide image may be a blank image. The data generation device 1100 may perform grid processing on the guide image by using the grid processing module and may obtain a plurality of grid areas (e.g., the guide image may be divided into a grid having grid areas). The data generation device 1100 may perform grid processing on the guide image to obtain N grid areas.

For example, the input size of the target model may be 512*512, the number of class labels that the target model is configured to identify may be 32, and the data generation device 1100 may be configured to receive square input data or non-square input data. The data generation device 1100 may perform grid processing on the guide image and may convert the guide image into the designated size of a plurality of grid areas of whole data. The data generation device 1100 may perform grid processing on the guide image and may readily select data to be noticed. For example, N, that is, the number of grid areas, may be set as 16*16, and the number of pixels included in each of the grid areas may be 32*32.

The data generation device 1100 may set anchor points to M respective first grid areas among the N grid areas by using the anchor point setting module. The data generation device 1100 may set anchor points in some of the grid areas.

The data generation device 1100 may set the number of anchor points according to the input data size of the target model. For example, the data generation device 1100 may set candidate items of the number of the anchor points to 1, 2, 4, or 8. The position of the anchor points may be evenly distributed (e.g., in a rectilinear pattern).

The data generation device 1100 may set grid data that is to be noticed by setting an anchor point, and data in another position may be generated according to the contour of actual data, and thus, the completeness of the data may be ensured. For example, a preset class label corresponding to a specific anchor point may be 1, the color of a class label corresponding to the preset class label 1 may be green, and the image content corresponding to the preset class label 1 may be a puppy.

A complete contour of the puppy around a first grid area including an anchor point may be generated according to data on the actual shape of the puppy, besides a partial image of the puppy being displayed in the first grid area including the anchor point, in finally generated image data.

To increase the pieces of information for generating data and a difference between anchor points, the data generation device 1100 may obtain a preset guide image by randomly assigning a preset class label to each pixel point of each first grid area of the M first grid areas each including an anchor point by using the label value assigning module. For example, the data generation device 1100 may randomly select a class label and may fill a grid area including each anchor point to maximally diversify a target of each anchor point and to ensure the diversity of data generated by differentiating the grid area including each anchor point.

The data generation device 1100 may obtain an optimization value of the input image based on a preset class label of each pixel point of the M first grid areas among the N grid areas included in the preset guide image and the segmented image by using the optimization value obtaining module 1102. A random preset class label value may be pre-assigned to each of the M first grid areas. N>1 and $1 \leq M \leq N$, and N and M may each be an integer.

The data generation device 1100 may obtain the optimization value by using a backward propagation algorithm to which a gradient descent technique is applied. The backward propagation algorithm to which the gradient descent technique is applied may include an SGD technique, but examples are not limited thereto.

According to embodiments, the data generation device 1100 may divide the segmented image into N grid areas by using the optimization value obtaining module 1102. The dividing method of the segmented image may be the same as the dividing method (or a grid processing method) of the preset guide image. The N grid areas of the segmented image may correspond one-to-one to the N grid areas of the preset guide image.

The data generation device 1100 may obtain the optimization value for the input image based on a preset class label of each pixel point of M first grid areas and a predicted class label of each pixel point of M second grid areas among the N grid areas of the segmented image by using the optimization value obtaining module 1102.

The M first grid areas and the M second grid areas may each be positioned corresponding to the preset guide image and the segmented image, and the M first grid areas may correspond one-to-one to the M second grid areas.

According to embodiments, the data generation device 1100 may obtain M loss function values by calculating a loss function value corresponding to each grid area pair based on a preset class label of a pixel point of a first grid area and a predicted class label of a pixel point of a second grid area for M pairs of the M first grid areas and the M second grid areas by using the optimization value obtaining module 1102. Each grid area pair may include one first grid area and one second grid area corresponding to the first grid area. The data generation device 1100 may determine the optimization value for the input image based on the M loss function values.

For example, under the assumption that the guide image includes 8 anchor points, the data generation device 1100 may calculate a loss function value corresponding to a grid area pair including a first grid area and a second grid area based on a preset class label corresponding to each pixel point of each of the first grid areas respectively including the 8 anchor points and a predicted class label corresponding to each pixel point of each of second grid areas respectively corresponding to the first grid areas. The data generation device 1100 may obtain 8 loss function values corresponding to a total of 8 grid area pairs.

According to embodiments, the data generation device 1100 may calculate a regularization function value based on a predicted class label of each pixel point of the segmented image and a preset class label corresponding to each pixel point of a first grid area by using the optimization value obtaining module 1102.

For example, the data generation device 1100 may calculate the regularization function value based on the predicted class label of each pixel point of the segmented image and a preset class label corresponding to each pixel point of each of 8 first grid areas by using the optimization value obtaining module 1102. The data generation device 1100 may regularize generated image data based on a regularization function and increase the stability and speed of the generated image data through such regularization.

The data generation device 1100 may determine the optimization value for the input image based on the regularization function value and the M loss function values by using the optimization value obtaining module 1102. For example, the optimization value obtaining module 1102 may determine the optimization value according to the regularization function value and 8 loss function values corresponding to 8 grid area pairs including 8 first grid areas and 8 second grid areas corresponding to the 8 first grid areas.

For example, the data generation device 1100 may calculate the loss function values by using a cross-entropy loss function. For example, the data generation device 1100 may calculate the loss function values according to Equation 1 above.

The data generation device 1100 may calculate the sum of the loss function values according to Equation 2 above. For example, under the assumption that the preset guide image includes 8 anchor points, the data generation device 1100 may calculate the sum of 8 loss function values corresponding to 8 first grid areas including the 8 anchor points.

According to embodiments, the data generation device 1100 may calculate a total distribution value corresponding to the noise image based on a predicted class label of each pixel point. The data generation device 1100 may calculate an L2-norm value corresponding to a first grid area based on a preset class label corresponding to each pixel point of each of the M first grid areas and the predicted class label.

For example, under the assumption that the preset guide image includes 8 anchor points, the data generation device

1100 may calculate an L2-norm value corresponding to the preset class label corresponding to each pixel point of each of the first grid areas and the predicted class label for the first grid areas respectively including 8 anchor points. The data generation device 1100 may obtain 8 L2-norm values respectively corresponding to the 8 first grid areas.

The data generation device 1100 may determine a regularization function value according to the 8 L2-norm values respectively corresponding to the 8 first grid areas and the total distribution corresponding to the noise image. For example, the data generation device 1100 may determine the regularization function value according to the 8 L2-norm values respectively corresponding to the 8 first grid areas and the total distribution corresponding to the noise image.

For example, the data generation device 1100 may calculate the L2-norm values and the total distribution corresponding to the noise image according to Equation 3 above.

The data generation device 1100 may calculate the sum of the L2-norm values corresponding to the M first grid areas according to Equation 4 above. For example, under the assumption that the preset guide image includes 8 anchor points, the data generation device 1100 may calculate the sum of 8 L2-norm values corresponding to 8 first grid areas including the 8 anchor points.

The data generation device 1100 may calculate the regularization function according to Equation 5 above.

The regularization function described above may be expressed as the following equation.

$$R(\hat{x})=\alpha_{t_{N}}R_{t_{N}}(\hat{x})+\alpha_{l2}R_{l2}(\hat{x})=\alpha_{t_{N}}R_{t_{N}}(\hat{x})+\alpha_{l2}\Sigma_{M}R_{l2}(\hat{x}_{M},\ y_{M})$$

When the optimization value does not satisfy a preset condition, the data generation device 1100 may optimize the input image based on the optimization value by using the optimization module 1103 and may obtain the optimized input image. The satisfying of the preset condition may mean that the optimization value is less than or equal to a preset threshold value. The preset threshold value may be set depending on actual demands, and may be set to 0.001, for example.

The data generation device 1100 may use the optimized input image as an input image for the next optimization until a final optimized image in which the optimization value satisfies the preset condition is obtained by using the final optimization image obtaining module 1104. The data generation device 1100 may update the noise image through repeated updates until the repeated updates end. Each noise image after the updates may be used as a noise image of an input target model for the next repetitive update. When the repeated updates are completed, the electronic device may use a final optimized image obtained after the repeated updates as an image for compressing the target model.

The data generation device 1100 may calculate the optimization value by using the loss function value and the regularization function value according to Equation 6 above.

According to embodiments, the data generation device 1100 may update an RGB value of each of a plurality of pixel points included in the input image based on the optimization value. The data generation device 1100 may set an optimizer for the target model and may stack a weight of a specific layer to be updated or random noise on the optimizer. When propagating the optimization value backward in each layer starting from an output layer of the target model, the data generation device 1100 may search for a layer that needs to be updated of the target model in the optimizer. When the layer that needs to be updated is not searched for, the data generation device 1100 may propagate the optimization value backward until the optimization value is propagated to the noise image.

For example, in a repetitive update process, the target model may always be fixed, and the data generation device 1100 may adjust and update the noise image without adjusting each layer of the target model.

Figure 12:
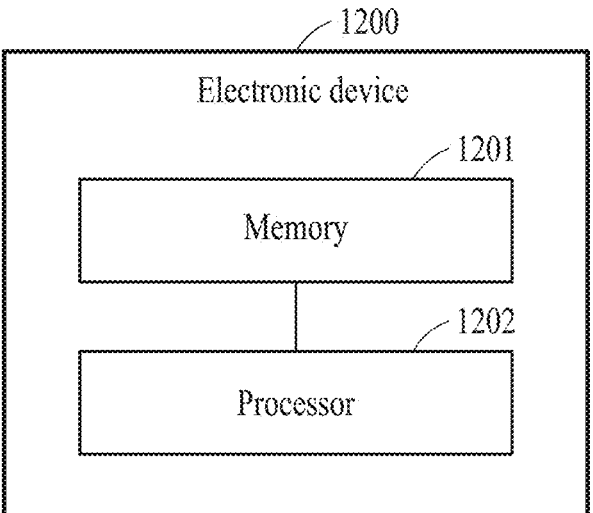
FIG. 12 illustrates an example electronic device, according to one or more embodiments.

FIG. 12 illustrates an example electronic device 1200, according to one or more embodiments.

Referring to FIG. 12, an electronic device 1200 may include at least one memory 1201 and at least one processor 1202, and a data generation method according to embodiments may be executed by the at least one memory 1201 storing instructions and the at least one processor 1202 executing the instructions.

For example, the electronic device 1200 may be a personal computer (PC), a tablet device, a personal digital assistant (PDA), a smartphone, or other devices for executing the above commands. In this case, the electronic device 1200 may not necessarily be a single electronic device 1200 and may be a device or a set of circuits for executing the commands (or a command set) individually or commonly described above. The electronic device 1200 may also be a part of an integrated control system or a system administrator or may be implemented as a portable electronic device that is locally or remotely (e.g., through wireless transmission) connected through an interface.

In the electronic device 1200, the at least one processor 1202 may include a central processing unit (CPU), a graphics processing unit (GPU), a programmable logic device, a dedicated processor system, a microcontroller, or a microprocessor. In addition, the at least one processor 1202 may further include an analog processor, a digital processor, a microprocessor, a multicore processor, a processor array, or a network processor, but examples are not limited thereto.

The at least one processor 1202 may execute the instructions or code stored in the at least one memory 1201. In this case, the at least one memory 1201 may store data. The commands and data may also be transmitted and received over a network through a network interface device. In this case, the network interface device may adopt any known transport protocol.

The at least one memory 1201 may be integrated with the at least one processor 1202 in a method of arranging a random-access memory (RAM) or a flash memory in an integrated circuit microprocessor. In addition, the at least one memory 2101 may include a separate device, such as an external disk drive, a storage array, or other storage devices that may be used by a database system. The operations of the at least one memory 1201 and the at least one processor 1202 may be combined with one another, or the at least one memory 1201 and the at least one processor 1202 may communicate with each other, for example, through an input/output (I/O) port or a network connection, such that the at least one processor 1202 may read files stored in the at least one memory 1201.

In addition, the electronic device 1200 may further include a video display (e.g., a liquid crystal display (LCD)) and a user interaction interface (e.g., a keyboard, a mouse, or a touch input device). All components of the electronic device 1200 may be connected to one another through a bus and/or a network.

The computing apparatuses, the electronic devices, the processors, the memories, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device comprising:
one or more processors; and
memory storing instructions configured to cause the one or more processors to:
generate a guide image comprising first grid areas, wherein each first grid area comprises pixels having a same guide label, and wherein at least some of the first grid areas have guide labels different from each other;
input an input image to a target model that performs segmenting on the input image to generate a segmented image whose pixels have respective class labels predicted by the target model, wherein second grid areas of the segmented image locationally respectively correspond to the first grid areas, and wherein each first grid area and its locationally respectively corresponding second grid area form a grid pair,
compute grid losses of the respectively corresponding grid pairs, wherein each grid loss is based on the grid labels in its first grid area and the class labels in its second grid area;
calculate an optimization value for the input image based on the grid losses, and
update the input image based on the optimization value by performing backpropagation through the target model according to the optimization value.

2. The electronic device of claim 1, wherein the instructions are further configured to cause the one or more processors to repeatedly update the input image by performing an operation comprised in a data generation method until the optimization value is less than a threshold value by using the updated input image.

3. The electronic device of claim 1, wherein the instructions are further configured to cause the one or more processors to
use a loss function to calculate the grid losses.

4. The electronic device of claim 3, wherein the loss function comprises
a regularization function.

5. The electronic device of claim 4, wherein the regularization function comprise a summation of a product based on a grid label and a class label.

6. The electronic device of claim 1, the first grid are areas comprise a determined subset of grid areas of the guide image, wherein the target model is configured to predict a set of predictable class labels, and wherein the guide image is generated by
setting the guide labels of the pixels of first grid areas to values of the predictable class labels.

7. A data generation method comprising:
generating a guide image comprising first grid areas, wherein each first grid area comprises pixels having a same guide label, and wherein at least some of the first grid areas have guide labels different from each other;
inputting an input image to a target model that performs segmenting on the input image to generate a segmented image whose pixels have respective class labels predicted by the target model, wherein second grid areas of the segmented image locationally respectively correspond to the first grid areas, and wherein each first grid area and its locationally respectively corresponding second grid area form a grid pair;

computing grid losses of the respectively corresponding grid pairs, wherein each grid loss is based on the grid labels in its first grid area and the class labels in its second grid area;

calculating an optimization value for the input image based on the grid losses; and update the input image based on the optimization value by performing backpropagation through the target model according to the optimization value.

8. The data generation method of claim 7, wherein an operation comprised in the data generation method is repeatedly performed until the optimization value is less than a threshold value by using the updated input image.

9. The data generation method of claim 7, further comprising:

using a loss function to calculate the grid losses.

10. The data generation method of claim 9, wherein the loss function comprises a regularization function.

11. The data generation method of claim 10, wherein the regularization function comprises summation of a product based on a grid label and a class label.

12. The data generation method of claim 7, wherein the first grid areas comprise determined subset of grid areas of the guide image, wherein the target model configured to predict a set of predictable cla ss labels, and the guide image is generated by setting the guide labels of the pixels of the first grid areas to values of the predictable class labels.

13. A data generation method comprising:

generating a guide image comprising first grid areas, wherein each first grid area comprises pixels having a same guide label, and wherein at least some of the first grid areas have guide labels different from each other refining an optimization value by performing, until a stop condition is reached, iterations of:

inputting an input image to a target model that performs segmenting on the input image to generate a segmented image whose pixels have respective class labels predicted by the target model, wherein second grid areas of the segmented image locationally respectively correspond to the first grid areas, and wherein each first grid area and its locationally respectively corresponding second grid area form a grid pair;

computing grid losses of the respectively corresponding grid pairs, wherein each grid loss is based on the grid labels in its first grid area and the class labels in its second grid area, wherein each grid loss is computed with a regularization function that comprises a sum of products, the products based on the guide labels of the corresponding first grid area and the class labels of the corresponding second grid area;

calculating the optimization value for the input image based on the grid losses; and updating the input image based on the optimization value by performing backpropagation through the target model according to the optimization value.

14. The data generation method of claim 13, wherein the guide labels of the first grid areas are set as a preset class label without being predicted, and wherein the guide labels belong to a set of predictable labels which the target model is configured to be capable of predicting.

15. The data generation method of claim 13, wherein the stop condition comprises the optimization value being less than a set threshold value or the repeated number of iterations performed reaches a maximum number of iterations.

* * * * *